United States Patent [19]

Hamilton

[11] Patent Number: 5,377,730
[45] Date of Patent: Jan. 3, 1995

[54] APPARATUS TO STABILIZE A CUT TREE IN THE VERTICAL POSITION DURING MOVEMENT BY A FELLER-BUNCHER

[75] Inventor: Douglas D. Hamilton, Mount Royal, Canada

[73] Assignee: Logging Development Corporation, Villa Mount Royal, Canada

[21] Appl. No.: 970,170

[22] Filed: Nov. 2, 1992

[51] Int. Cl.6 .......................... A01G 23/08; B27B 1/00
[52] U.S. Cl. ...................................... 144/3 D; 83/360; 144/34 R; 144/335; 144/356; 414/23; 414/701; 901/34
[58] Field of Search .................... 901/34; 414/23, 699, 414/700, 701; 83/360, 928; 30/379, 379.5; 144/3 D, 34 R, 34 E, 356, 357, 335

[56] References Cited

U.S. PATENT DOCUMENTS

| | | | |
|---|---|---|---|
| 4,015,729 | 4/1977 | Parquet et al. | 414/699 |
| 4,022,259 | 5/1977 | Sturtz, Jr. | 144/34 E |
| 4,039,009 | 8/1977 | Lindblom | 144/34 E |
| 4,108,224 | 8/1978 | Wirt | 144/34 E |
| 5,161,588 | 11/1992 | Hamilton | 144/34 E |
| 5,195,864 | 3/1993 | Drake et al. | 414/699 |

Primary Examiner—W. Donald Bray
Attorney, Agent, or Firm—Stanley E. Johnson

[57] ABSTRACT

A load stabilizing means for elongated objects grasped at one end and held vertically comprising gravity induced signals to hydraulic power and control means to correct deviations of the axis of the longitudinal object from the vertical. The preferred embodiment applies the invention to felling heads on light carriers.

6 Claims, 2 Drawing Sheets

APPARATUS TO STABILIZE A CUT TREE IN THE VERTICAL POSITION DURING MOVEMENT BY A FELLER-BUNCHER

FIELD OF THE INVENTION

This invention relates primarily to the harvesting of trees and the stability problems encountered in moving such trees, in a vertical attitude, over uneven terrain. It could also be important to the manipulation of poles and the like. Conventional apparatus requires large carriers for stability. This invention will stabilize the trees and thus permit much smaller and more economical carriers. It is able to do so, in the preferred embodiment, by utilizing gravity induced signals and some emerging technology in the electrohydraulic remote control field.

BACKGROUND OF THE INVENTION

In my co-pending U.S. patent application Ser. No. 07/801,881, now U.S. Pat. No. 5,161,588 I have laid out the case for light-weight felling heads and disclosed a design for such a head. I also stated that such heads will permit smaller, lighter carriers. The level to which carrier weight can be reduced largely depends—in the case where the head is attached to the carrier by an extendible and retractable boom—on the maximum reach of the boom to be used, the maximum tree load that must be managed at that reach, and the type of terrain on which the machine is positioned. In the case where the felling head is directly connected to the carrier by a fixed length boom or forks, the carrier weight depends largely on the maximum tree load that must be managed, on whether each tree will be dropped to the ground as it is cut or whether one or more trees must be transported—in an essentially vertical position—and dumped in concentrations and, in the latter case, the type of terrain to be negotiated.

This invention relates mainly to the latter case where a carrier must travel over uneven terrain with a tree or trees in an essentially vertical attitude. The loads with which the carrier must cope are the direct weight of the tree or trees. This seldom exceeds the weight of the felling head and is therefore not a major factor in carrier stability considerations. The location of the centre of gravity of the tree load, however, is. This is usually at 30% to 40% of the full tree height from the butt. In a common case, the C.G. of an 80' tree could be located some 30 feet above the base of the tree. A carrier holding such a tree in a vertical position and travelling over uneven terrain would need to be large enough and heavy enough to absorb the overturning moments created by the acceleration and deceleration of the tree as it pitches randomly with the pitching of the carrier.

In my experience a 25,000# carrier is acceptably stable for felling and transporting trees in a vertical position to a maximum single tree size of 20" diameter and 80' height and weighing 2,500#.

The purpose of this invention is to stabilize the tree loads against pitching and thus permit the use of much smaller and lighter carriers than would otherwise be the case. With a fully effective stabilizing means the carrier would only be required to carry an additional 2,500# directly at the felling head position. Those skilled in the art will readily see that this will permit a dramatic reduction in the size and weight of the carrier required to harvest the aforementioned tree and a commensurate improvement in the harvesting economics.

While the use of such devices is stressed as a benefit to small carriers, their utility in stabilizing any elongated object to be moved with its long axis vertically oriented will be readily seen.

SUMMARY OF THE INVENTION

The essence of my invention is to support a tree—or any elongated object vertically with apparatus which can be adjusted with hydraulic cylinders to correct deviations from the vertical and to provide sensors on that apparatus which sense such deviations and issue corrective signals to hydraulic apparatus powering the aforementioned cylinders. The preferred embodiment uses sensors based on the pendulum. It is important to the satisfactory functioning of this invention that the pendulum be dampened to avoid excessive oscillation resulting in excessive reversals in hydraulic oil flows. Proportional solenoids receiving variable current flows from pendulum-actuated potentiometers also add to the smoothness of the operation as they avoid the shocks that switches and on-off solenoids would engender.

List of Drawings

The invention is illustrated by way of example in the accompanying drawings wherein.

DESCRIPTION OF PREFERRED EMBODIMENT

Figure 1:
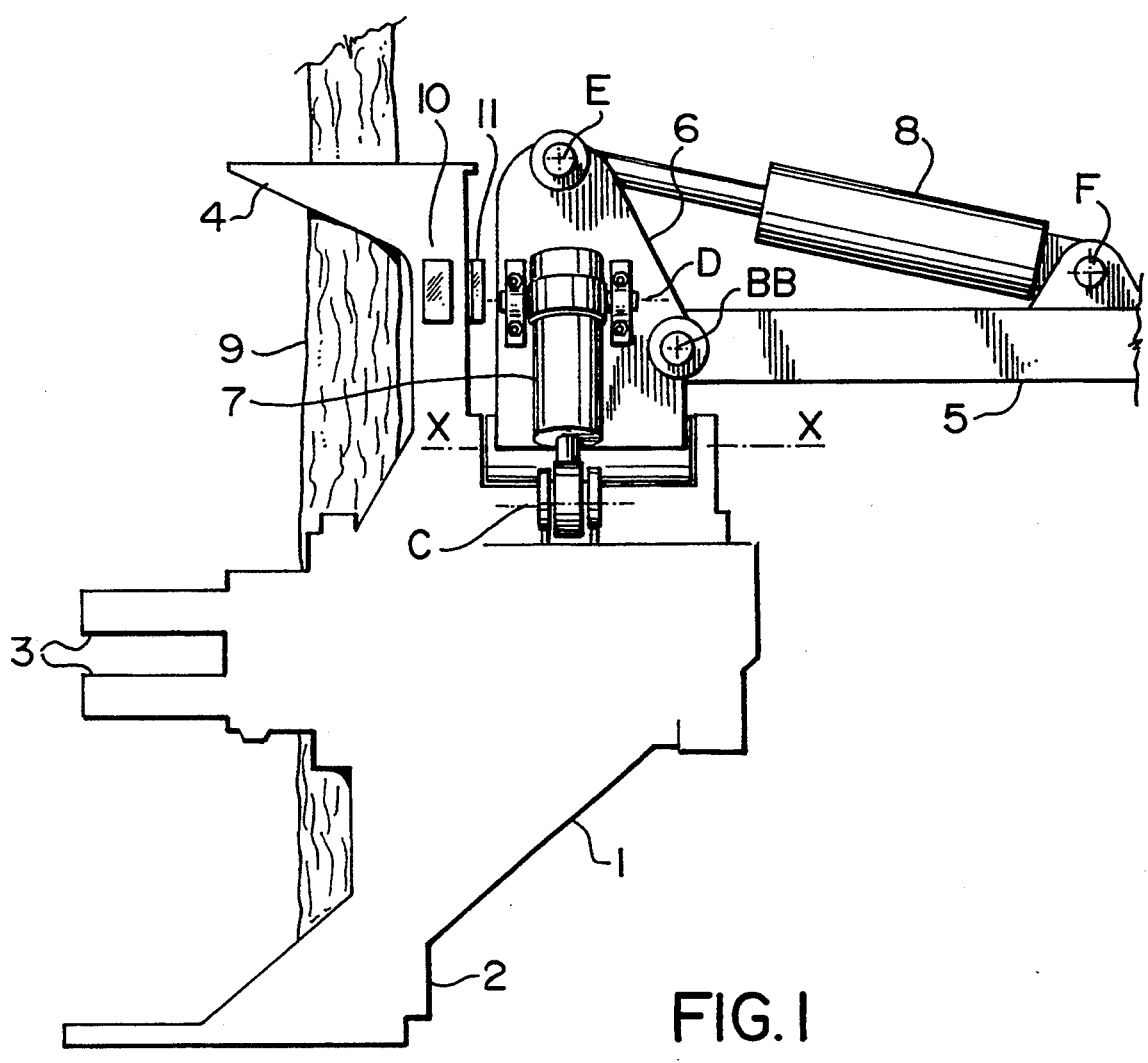
FIG. 1 is an elevation view of a felling head illustrating means to attach it to a boom including two hydraulic cylinders in planes at right angles to one another which together provide universal adjustment of the felling head with respect to the boom.

FIG. 1 illustrates a conventional tree felling head comprising a frame 1, with attached severing device 2, grapples 3 and stabilizing abutment 4. It is attached to a boom 5 which in turn is attached to a carrier (not shown). The interconnection between the boom 5 and the frame 1 comprises a housing 6 pivotally connected to frame 1, a long axis XX and pivotally connected to the boom 5 along axis BB. Control of the felling head rotation about axis XX is effected by hydraulic cylinder 7 which is pivotally connected to the frame 1 on axis C and the housing 6 on axis D. Control of the rotation of the frame 1 and the housing 6 about axis BB is effected by hydraulic cylinder 8 which is pivotally attached to the housing 6 on axis E and the boom 5 on axis F. It can be readily seen that control of cylinders 7 and 8 provides control of the attitude of the tree 9 clamped by the grapples 3.

Items 10 and 11 are sensing devices which detect deviations of the longitudinal axis of frame 1—and thus tree 9—from the vertical and transmit corrective signals to the hydraulic system controlling cylinders 7 and 8.

Figure 2:
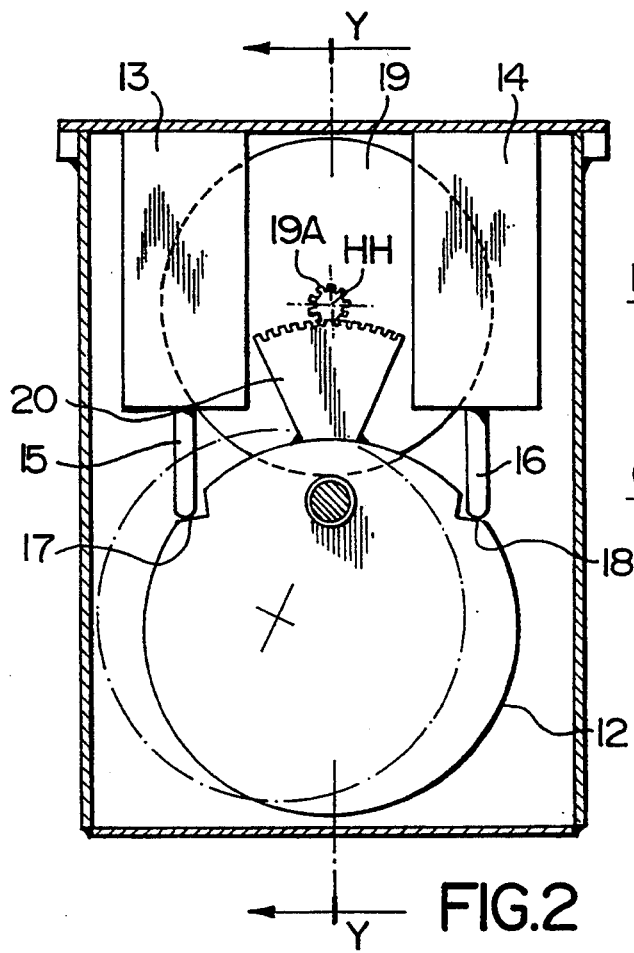
FIG. 2 and FIG. 3 illustrate a device for sensing deviations from the vertical employing a dampened pendulum and potentiometers.
Figure 3:
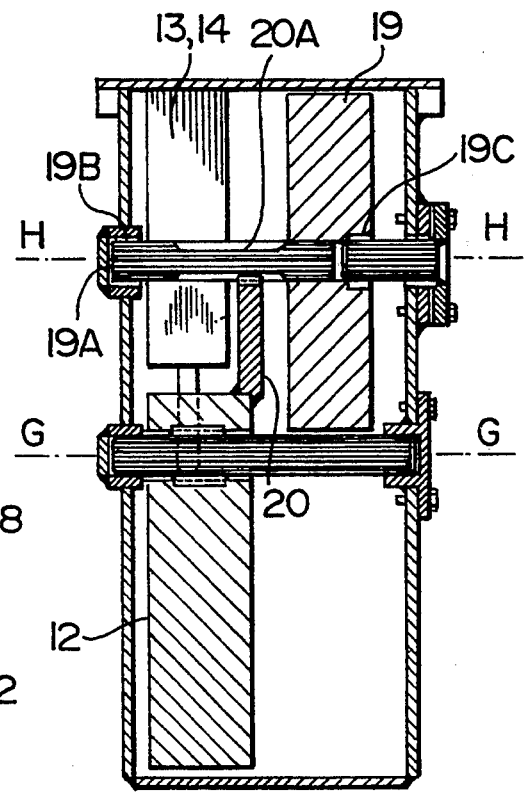

FIGS. 2 and 3 illustrate a type of sensor that could be employed at positions 10 and 11 of FIG. 1. Element 12 is a pendulum freely suspended on axis GG to oscillate under the force of gravity—i.e. it detects deviations from the vertical. Potentiometers 13 and 14 are fixed above pendulum 12 and in the same plane. Potentiometer push rods 15 and 16 rest on the pendulum's shoulders 17 and 18. It can be readily seen that when the pendulum 12 moves it pushes rod 15 or 16 to activate potentiometer 13 or 14. It is noted that the design and operation of potentiometers is well known. It is also noted that inductive devices can serve the same purpose and are also well known. Item 19 is a fly wheel employed to dampen the oscillations of pendulum 12. It is caused to rotate about axis HH by element 20 which is a gear segment fixed to pendulum 12. The teeth of element 20 engage with teeth 20A on shaft 19A to which is fixed fly wheel 19. Shaft 19A rotates freely with fly wheel 19 on bearings 19B and 19C. Thus when pendulum 12 rotates about axis GG fly wheel 19 is caused to rotate about axis HH. Proportions of pendulum 12 will be determined mainly by the force and stroke required by devices 13 and 14. These may prove to be small, particularly where inductive devices are used and where the rods 15 and 16 are pin connected to pendulum 12 thus obviating the need for return springs. The proportions of damping fly wheel 19 will be a function of the proportions of pendulum 12 and the speed with which it rotates relative pendulum 12's speed. This can be varied by changing the gear ratios between axes GG and HH.

Electrical connections and sensor mounting means are not shown as their location is a matter of convenience.

Figure 4:
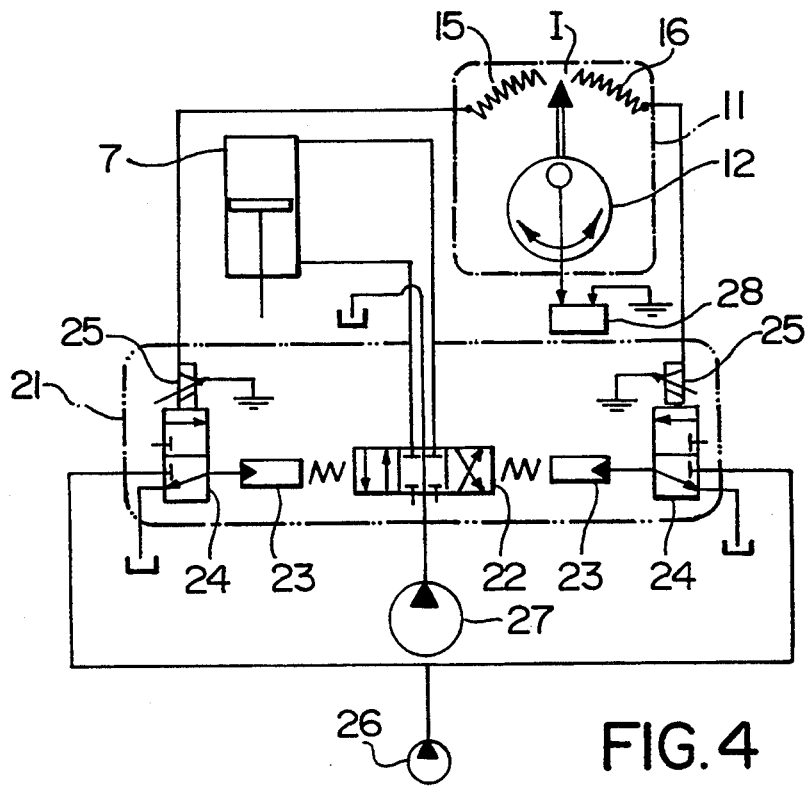
FIG. 4 is an electric and hydraulic diagram illustrating the apparatus required to correct deviations detected by the sensors.

FIG. 4 is a schematic of the electrical and hydraulic circuitry associated with one sensor and the cylinder which it commands—in this case sensor 11 and cylinder 7. Sensor 11 is oriented so that the plane of oscillation of its pendulum is parallel to the plane in which cylinder 7 lies. Thus signals from sensor 11 cause cylinder 7 to correct for lateral inclinations of frame 1. The combination of sensor 10 and cylinder 8 require circuitry identical to FIG. 4 and correct for inclinations at right angles to those detected by sensor 11—thus universal adjustment of the attitude of frame 1 and tree 9 which it holds can be made.

In FIG. 4, item 21 is a valve assembly comprising a 4-way spring centered valve 22 with servo-cylinders 23 to shift its spool. Servo-cylinders 23 are fed by servo-valves 24 which are in turn actuated by proportional solenoids 25. The proportional solenoids are in turn actuated in proportion to the flow of current from the potentiometers 15 and 16 in sensor 11. Battery 28 provides the electrical supply to sensor 11. Hydraulic pump 26 provides low pressure oil to actuate servo-cylinders 23 and pump 27 provides high pressure oil to actual cylinder 7.

It should be noted that there is a small dead band at point I. No current flows through either potentiometer at this point and the sensors should be installed on the head such that there is zero current when the longitudinal axis of the frame 1 is vertical.

In an operating example a felling head is attached to a wheeled carrier through boom 5. The operation is to sever standing trees and transport them, in a vertical attitude, to a concentration of trees an tip them over and drop them into said concentration. Because of the high centre of gravity of the tree load and the pitching of the carrier on uneven terrain, there is a high potential for overturning. In my invention the sensors 10 and 11 continually monitor the attitude of the felling head—and thus the trees—and signal the hydraulic system to keep it vertical. In conventionally equipped carriers for this type of operation the carrier is sized primarily to absorb these overturning loads. With my invention these loads will be reduced to the point where a much smaller and thus more economical carrier can accomplish the same task.

While it is not illustrated it will be obvious to anyone skilled in the art that a simple switching mechanism will permit control transfer of cylinders 7 and 8 to a two axis joy stick control using potentiometers or inductive devices for manual control of the cylinders for dumping, etc.

What I have described is the preferred embodiment from the simplicity and economic points of view. There are other variations of the same invention. For example where finer control is required the proportional solenoids can be replaced by torque motors and the 4-way valves by an over-centre pumps. Hydraulic remote control technology can also be used. Metering valves would replace the potentiometers with hoses connecting them directly to servo-cylinders on the main valve or on an over-centre pump.

I claim:

1. A load stabilizing means for elongated objects fixed by grapple means at or near one end and held substantially vertically comprising:
   (a) hydraulic cylinder means associated with said grapple means to permit universal adjustment of the longitudinal axis of said elongated objects with respect to the vertical;
   (b) hydraulic power and control means to actuate said cylinders;
   (c) sensing means associated with said grappling means to detect deviations in the attitude of the elongated object from the vertical and to transmit a corrective signal to the hydraulic power and control means; and
   (d) means in the hydraulic power and control means to receive and signal and convert it to a flow of hydraulic oil to the said cylinder means.

2. A load stabilizing means as defined in claim 1 wherein said sensing means responds to the force of gravity.

3. A load stabilizing means as defined in claim 1 or claim 2 wherein said sensing means includes a pendulum.

4. A load stabilizing means as defined in claims 2 or 3 wherein current control devices emit a flow of electricity which is substantially proportional to the degree of deflection of the longitudinal axis of said elongated object from the vertical.

5. A load stabilizing means as defined in claim 4 wherein said flow of electricity is received by said hydraulic power and control means and converted to a flow of hydraulic oil to said hydraulic cylinder means which is substantially proportional to said flow of electricity.

6. A feller-buncher for severing standing trees and moving said trees in the vertical attitude comprising:
   (a) a self-propelled carrier,
   (b) a felling head for grappling and severing standing trees;
   (c) means to attach said felling head to said carrier;
   (d) hydraulic power and control means on said carder to actuate said felling head;
   (e) sensing means on said felling head to detect deviations from the vertical of the tree grappled by the felling head and to emit signals in proportion to said deviation, and
   (f) means associated with said power and control means to receive said signals and convert them to a flow of hydraulic oil to said felling head to correct said deviation.

* * * * *